US006543345B1

(12) United States Patent
Huh

(10) Patent No.: US 6,543,345 B1
(45) Date of Patent: Apr. 8, 2003

(54) SUDDEN BRAKING APPARATUS FOR PRESS

(75) Inventor: Myung Ho Huh, 1055-52, Kwangan-dong, Sooyung-ku, Pusan 613-100 (KR)

(73) Assignee: Myung Ho Huh, Pusan (KR)

( * ) Notice: Subject to any disclaimer, the term of this patent is extended or adjusted under 35 U.S.C. 154(b) by 0 days.

(21) Appl. No.: 09/647,144

(22) PCT Filed: Apr. 1, 1999

(86) PCT No.: PCT/KR99/00158

§ 371 (c)(1),
(2), (4) Date: Sep. 26, 2000

(87) PCT Pub. No.: WO99/51427

PCT Pub. Date: Oct. 14, 1999

(30) Foreign Application Priority Data

Apr. 4, 1998 (KR) ............................................ 98-5327

(51) Int. Cl.[7] ............................................ F16P 1/100
(52) U.S. Cl. ............................................ 100/341
(58) Field of Search ......................... 100/341, 99, 214, 100/345, 346, 347; 192/12 R

(56) References Cited

U.S. PATENT DOCUMENTS 1,965,237 A 7/1934 Hawkins
2,169,747 A * 8/1939 Treer ........................ 192/12 R
2,505,600 A * 4/1950 Wissman .................... 188/366
2,667,248 A * 1/1954 Wissman .................... 100/282
4,095,523 A 6/1978 Drungil
4,190,143 A * 2/1980 Orita ...................... 192/129 B

* cited by examiner

*Primary Examiner*—Allen Ostrager
*Assistant Examiner*—Shelley Self
(74) *Attorney, Agent, or Firm*—Anderson Kill & Olick; Eugene Lieberstein; Michael N. Meller

(57) ABSTRACT

The present invention discloses a sudden braking apparatus for a press comprising a driving motor (6), a flywheel (5) connected to the motor through a pulley (7) and a belt (8), a small gear (9) connected to the flywheel through a rotational shaft (3) installed horizontally to a supporting frame (2), a large gear (10) engaged with the small gear and installed on a crankshaft **(11*b*) of the press, and a cam (14) mounted at the crankshaft (11*a*, 11*b*) and connected to a slide-block (12) via a crank rod (13), characterized in that the apparatus comprises a circular guide (19) slidably connected to the crankshaft (11*b*) and having a brake lining (16) on one side of the guide (19) facing the supporting frame (2), a radial toothed gear (18) on the other side of the guide and a tapered groove (15) extending from the circumference. In addition the apparatus includes a clutch plate (22) shifting device which enables the circular guide (19)** to move horizontally.

1 Claim, 2 Drawing Sheets

SUDDEN BRAKING APPARATUS FOR PRESS

FIELD OF THE INVENTION

The present invention relates to a power press, in particular to a sudden braking apparatus for the power press, to prevent accidents during the operation of the press by making it possible to instantaneously stop the operation of the press.

BACKGROUND OF THE INVENTION

In general, the press is typically a dangerous machine which causes industrial accidents in the field of manufacturing. Even though presently the number of industrial accidents is decreasing, the rate of accidents due to presses is not decreasing, and therefore a countermeasure to rectify this problem is required.

Furthermore, because conventional presses are mostly pin-clutch types, even if such circumstances as a finger of operator getting into the press mold owing to carelessness on the part of the operator arise, the operation of the conventional press cannot be stopped suddenly. A press, which is composed of an air-clutch enabling the press to stop instantaneously using a sensor such as an infrared beam switch, is widely known to prevent the above problem in the event of such dangerous situations. However, as the price of such a press is high, it is difficult for small-scale manufacturing companies to purchase it.

In addition, the basic structure of the air-clutch part is so complex that it has many parts which need to be remodeled when the press is provided with the air-clutch. Furthermore, as the price of the air-clutch is high, if the conventional model is to be converted into a new one having the air-clutch, then this should be carried out by specialized persons. Therefore, because of the financial losses due to idle time due to conversion and the high cost incurred by conversion, the conventional press is still used and the danger of accidents is tolerated.

SUMMARY OF THE INVENTION

The present invention is presented to solve the aforementioned problem and it is an object of the present invention to provide a sudden braking apparatus using braking system disposed at the crank shaft of the press, by which the operation of the slide block can be braked instantaneously, thereby preventing operator's accidents, reducing the manufacturing costs and achieving easy conversion as well as achieving prompt operation due to its being controlled directly and not through a large gear.

In order to achieve the aforementioned object, the present invention comprises a circular guide set up to the crankshaft and having a brake lining at the side of press frame, a radially toothed gear at the other side and a groove taperingly formed along the side of the circumference in the central part of the guide body; a clutch plate having a radially toothed gear matching the radial toothed gear fixed to a large driving gear; and a fork having one pair of rollers installed on the end parts of both ends of the fork for free rotation and installed to the supporting frame in order to enable the fork to shift the circular guide using a hydraulic cylinder through an operating rod. In this way the circular guide can then be shifted, which enables the up and down motion of the slide-block to stop suddenly.

DETAILED DESCRIPTION OF THE INVENTION

Hereinafter, the present invention will be explained in detail with reference to the accompanying drawings.

Figure 1:
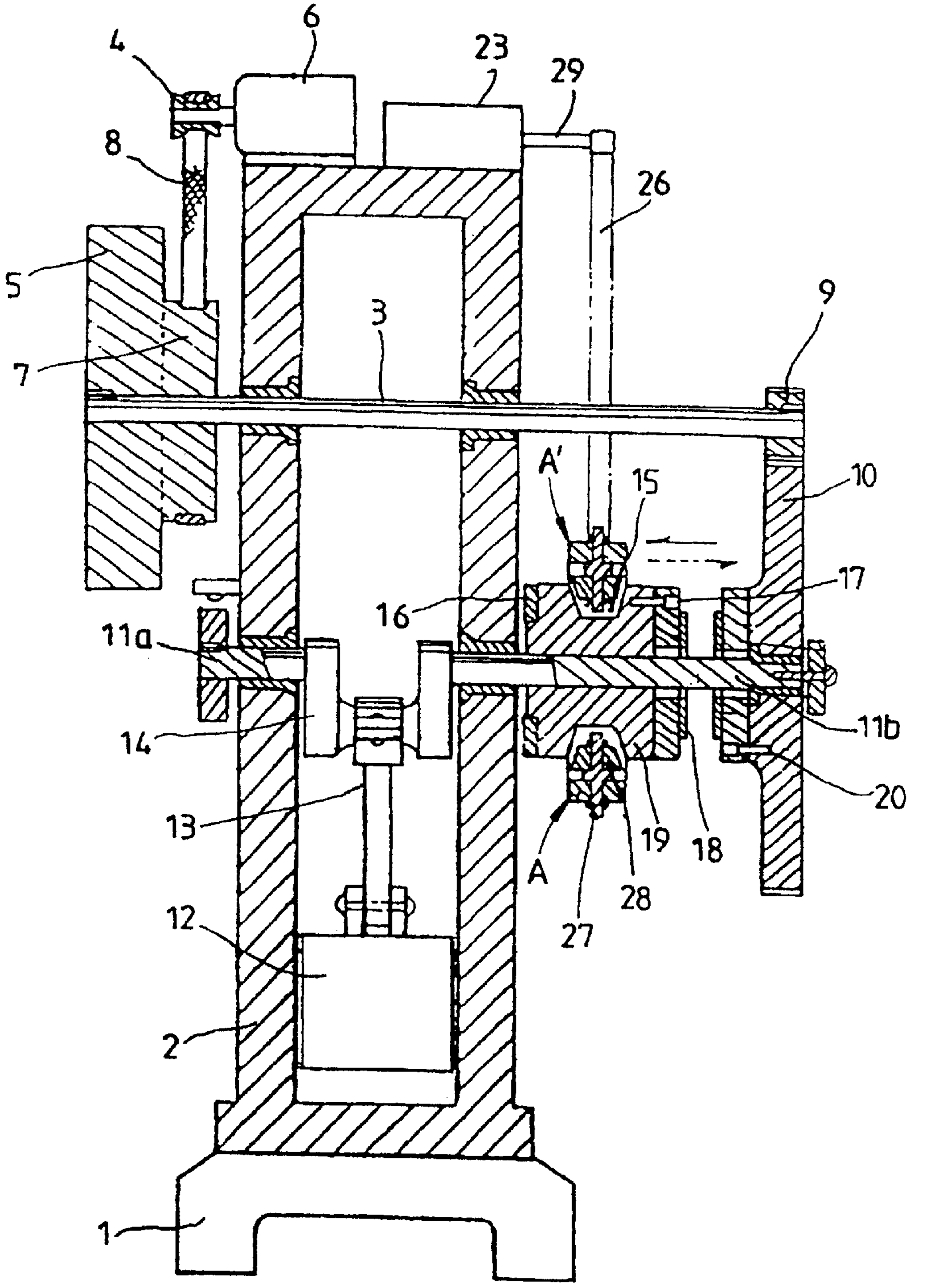
FIG. 1 is an outline cross-sectional view showing a sudden braking apparatus for a press according to the present invention.

As shown in FIG. 1, the present invention comprises a supporting frame 2 fixed vertically to a base 1, a rotational axis 3 set up horizontally to the upper part of the supporting frame 2, a flywheel 5 provided with a pulley 7 mounted to one end part of the rotational axis 3 and connected to the rotational axis (not shown) of the driving motor 6 through a pulley 4 and a belt 8. A small gear 9 is mounted at the other end part of the rotational axis 3 and engaged with a large gear 10 described later so that torque is transmitted from the flywheel 5 to the large gear 10.

Furthermore, a crankshaft, disposed below the rotational axis, is divided into two parts 11*a,* 11*b,* which have a polygonal section and a circular section respectively. The crankshaft 11*a,* 11*b* is installed in parallel with the rotational axis 3 by means of a bearing(not shown).

In addition, the crankshaft 11*a,* 11*b* is connected with a cam 14 installed to a crank-rod 13 which enables the slide-block 12 to elevate. A circular guide 19 is disposed at polygonal of the crankshaft 11*b.* A groove 15 is formed taperingly along the side of the circumference in the middle part of the surface of the circular guide 19, a brake lining 16 is attached to one side of the circular guide 19 and on the other side corresponding to this the radially toothed gear 18 is installed by jointing means such as a bolt 17.

Figure 2:
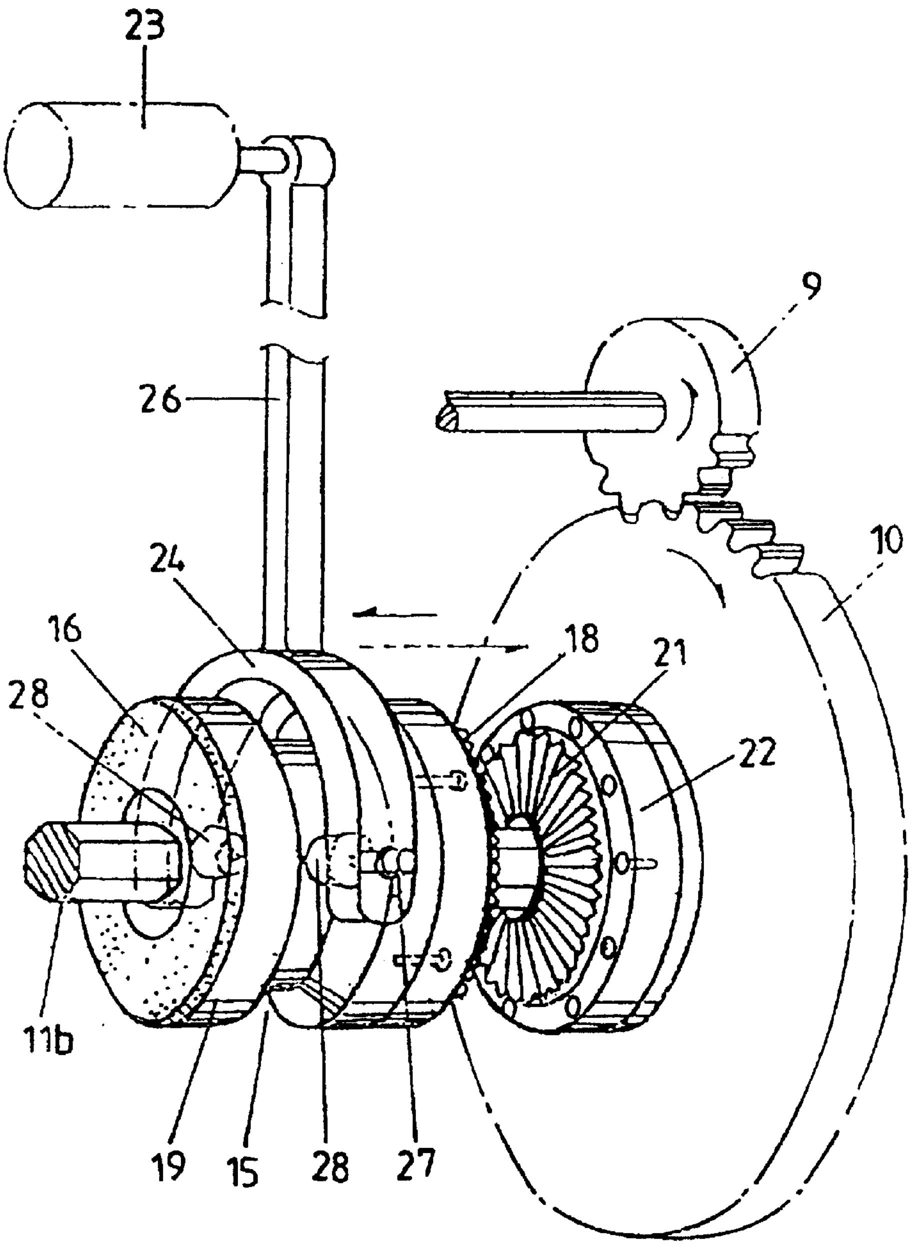
FIG. 2 is a perspective view of the main part so as to explain the braking principle according to the present invention.

Furthermore, a large gear 20 equipped with a clutch plate 22 on which the radially toothed gear 21 is fixed by jointing means such as a bolt 20 with a shape matching the radially toothed gear 18 disposed on the circular guide 19 is set up to rotate freely at the end part of one side of the crankshaft 11*b* as shown in FIG. 2, and this large gear is engaged with the small gear 9.

In addition, a fork 24 is located over the circular guide 19, and the fork 24 moves backward(left) and forward(right) according to the stretching action of a hydraulic cylinder mounted on the upper part of the supporting frame 2. The fork 24 is connected as one body to an operation rod 26 of which the body 25 is in the shape of a horse hoof, and is set up vertically to the piston rod 29 of the cylinder. To both end parts of the body 25, one pair of rollers 28 are mounted through a shaft 27 and the rollers 28 constitute a section of a circular cone shape which has the same slope as the oblique section of the groove 15.

In FIG. 1, the roller part(A,A') are shown at the position of 90° C. rotation, in order to display the total parts.

Furthermore, in the entry part of the mold of the sudden braking apparatus for the press according to the present invention, a sensor such as a photo sensor(not shown) is installed to be connected with the cylinder 23 electrically. Consequently, during the elevating motion of a slide-block 12, in the event of dangerous situations such as when a hand is held between the mold owing to an operator's carelessness and so on, the sensor perceives this situation and makes the piston-rod 29 move backward by applying the control power to the cylinder 23. Any of either a hydraulic or a pneumatic pressure may be used as a working fluid.

The operation and effect according to the present invention are as follows.

The sudden braking apparatus for the press according to the present invention is characterized in that if the sensor detects a dangerous situation and makes the cylinder 23 work, then the fork 24 enables the circular guide 19 to move, which artificially prevents the large gear 10 from rotating and consequently enables the operation of the slide-block 11 installed to the crankshafts 11*a*, 11*b* to stop promptly.

That is, if the press 29 is turned on, then a driving motor 6 operates and transmits its torque to the flywheel 5 through the belt 8, which enables the small gear 9 mounted to the rotational axis 3 and the large gear 10 engaged with the small gear 9 to rotate at the same time.

Furthermore, under such conditions, if the cylinder is made to move forward(right) by operating a switch such as a foot switch installed to the press 29, then the fork 24 being pushed out by the operation rod 26 and the circular guide 19 moves in the direction shown in the dotted line in FIG. 2, that is, in the direction of the large gear 10.

Accordingly, the rotational force of the large gear 10 is transmitted to the crankshaft 11*b* owing to the fact that the radial teeth 18,21 are engaged with each other and so the slide-block 12 elevates upward and downward by means of a cam 14 which enables the press to work the target.

Furthermore, during the operation of the press, if dangerous situations arise such as the operator's hand being held between the mold, then due to the sensor which perceives this situation, the required control power is applied to the cylinder 23, which makes the piston rod 29 move backward. Following this, the fork 24 is pushed in the direction of the supporting frame 2 which is the direction shown in the solid line in FIG. 2, through the operation rod 26, which causes the separation of the radial teeth 18,21 and as a result of the separation, the force of inertia of the flywheel 5 can not be transmitted to the crankshaft. In addition, the lining 16 mounted on the circular guide 19 sticks to the side wall of the supporting frame 2, so that it controls the rotation of the crankshaft 11*b*. As a result, the rotation of the circular guide 19 and the crankshaft can be suddenly halted. Accordingly, it is possible to stop the elevating motion of the slide-block 12 suddenly.

Meanwhile, the roller 28 installed to the fork 24 which moves backward and forward by the operation rod 26 comprises a section of a circular cone shape which has the same slope as the oblique section of the tapered groove 15 of the circular guide 19, so that it is possible to reduce to a minimum abrasion owing to friction with the groove 15 in the event of moving back and forth. Therefore, the fork can be shifted smoothly without frictional resistance with the circular guide 19.

The present invention can be realized in various ways without departing from the sprit and scope of the invention. In addition, the present invention is not limited to the illustrated and explained embodiment. All variations within the above description and following claims will be included in the scope of the present invention.

What is claimed is:

1. A sudden braking apparatus for a press comprising a driving motor (6), a flywheel (5) connected to the motor through a pulley (7) and a belt (8), a small gear (9) connected to the flywheel through a rotational shaft (3) installed horizontally to a supporting frame (2), a large gear (10) engaged with the small gear and installed on a crankshaft (11*b*) of the press, and a cam (14) mounted at the crankshaft (11*a*, 11*b*) and connected to a slide-block (12) via a crank rod (13), characterized in that the apparatus comprises a circular guide (19) slidably connected to the crankshaft (11*b*) to rotate therewith and having a brake lining (16) on one side of the guide (19) facing the supporting frame (2), a radial toothed gear (18) located on the opposite side of the guide and a tapered groove (15) radially extending inwardly from the circumference of the guide;

a clutch plate (22) having a radial toothed gear (21) matching the radial toothed gear (18) and fixed to a large gear (10) for rotation about the crankshaft (11*b*); and a shifting means which enables the circular guide (19) to move horizontally, with the shifting means mounted between the circular guide and the supporting frame (2), wherein the shifting means comprises a fork (24) installed on the circular guide (19) and connected to a cylinder (23) through an operating rod (26) so that the operation rod (26) and the fork (24) can shift the circular guide (19), and rollers (28) mounted on both ends of the fork (24).

* * * * *